Figure 1:
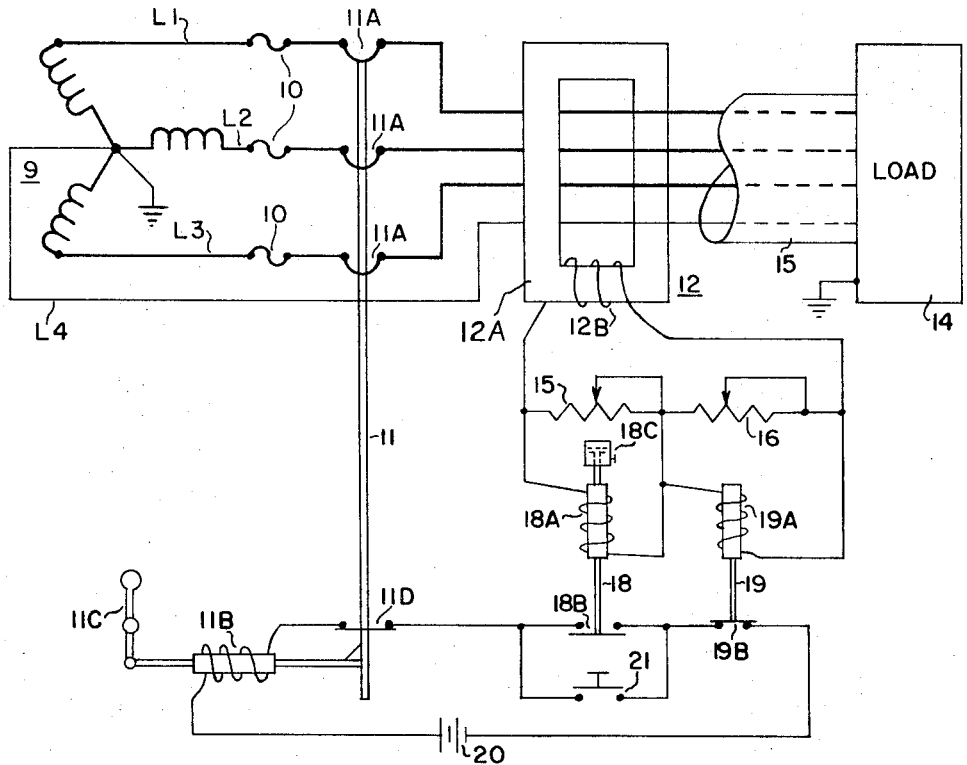

United States Patent

[11] 3,579,038

| [72] | Inventors | Robert P. Backderf<br>Franklin;<br>Douglas R. Kanitz, Middletown, Ohio |
|---|---|---|
| [21] | Appl. No. | 850,212 |
| [22] | Filed | Aug. 14, 1969 |
| [45] | Patented | May 18, 1971 |
| [73] | Assignee | Square D Company<br>Park Ridge, Ill. |

[54] ELECTRICAL FAULT PROTECTION SYSTEM
7 Claims, 3 Drawing Figs.

[52] U.S. Cl. ........................................... 317/18,
307/235, 317/27, 317/36, 317/40, 317/46
[51] Int. Cl. ........................................... H02h 3/28,
H02h 7/26
[50] Field of Search........................................... 317/18 (D),
27, 54, 46, 36 (TD), 135, 40; 307/235

[56] References Cited
UNITED STATES PATENTS
| 3,213,321 | 10/1965 | Dalziel | 317/18 |
|---|---|---|---|
| 3,286,129 | 11/1966 | Gagniere | 317/18 |
| 3,492,533 | 1/1970 | Thurston | 317/18 |

*Primary Examiner*—James D. Trammell
*Attorneys*—Harold J. Rathbun and Richard T. Guttman ABSTRACT: A normally open relay and a normally closed relay responsive to fault currents in an electrical distribution system control the opening of a disconnect switch incapable of interrupting large fault currents. The contacts of the relays are connected in series in an energizing circuit for an electroresponsive operator of the disconnect switch. Upon occurrence of a small fault, such as a ground fault, the contact of the normally open relay closes after a short time delay to effect opening of the disconnect switch. Upon occurrence of a large fault, the contact of the normally open relay also closes as for a small fault, but the contact of the normally closed relay opens instantaneously to prevent opening of the disconnect switch.

ROBERT P. BACKDERF
DOUGLAS R. KANITZ
INVENTORS

BY *Harold J. Rathbun*

ATTORNEY

ELECTRICAL FAULT PROTECTION SYSTEM

This invention relates to the protection of low-voltage electrical distribution systems, and more particularly to improved protective circuitry and apparatus which distinguishes between small and large fault currents.

Electrical distribution systems rated at 600 volts or less usually include current-responsive protective devices of adequate current-interrupting ability which open the offending circuit automatically when large currents flow as a result of a short circuit or an overload. However, many faults which occur in such systems, particularly ground faults, often result in fault currents that are too small to operate the usual overcurrent protective devices at all or within a short enough time to prevent damage. Such low-magnitude faults are often accompanied by arcing which damages the busway of the system or other equipment and which often causes a fire. There is need for an economical means to interrupt the offending circuit quickly under these conditions.

The electrical distribution systems under consideration often include disconnect switches, such as bolted pressure contact switches, which may be opened to isolate the system or a portion of it under normal load conditions but which, because their current-interrupting ability is limited, cannot safely be opened under all short circuit or overload conditions. Such switches often are arranged to be opened by an electromagnet or a motor upon closure of a remotely located pushbutton.

An object of this invention is to provide current-sensitive circuitry and apparatus which automatically effect opening of a disconnect switch in a distribution system upon occurrence of a ground fault, or other fault-produced current, less than the current-interrupting ability of the disconnect switch and too small to cause operation of the usual circuit protective device or devices, and which prevent opening of the disconnect switch upon occurrence of a large fault current that will be safely interrupted by the usual current-responsive protective device or devices of the system.

In accordance with this invention, a normally open relay and a normally closed relay responsive to fault currents in an electrical distribution system have their contacts connected in series for controlling the opening of a disconnect switch incapable of interrupting large fault currents. In the event of a small fault, such as a ground fault, the normally closed relay does not pick up and the normally open relay picks up after a short time delay to effect opening of the disconnect switch. In the event of a large fault, the normally open relay also picks up as for a small fault, but the normally closed relay picks up instantaneously thereby to prevent opening of the disconnect switch.

Figure 3:
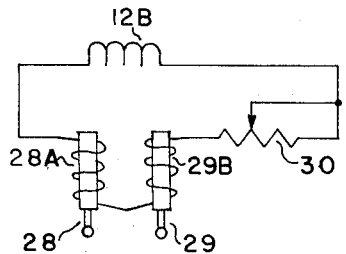
Figure 2:
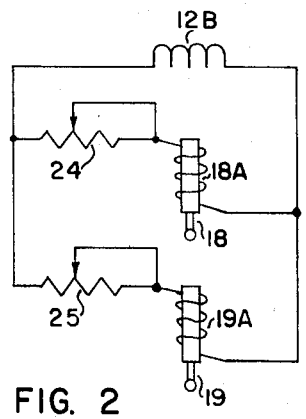

Further objects and advantages of the invention will become apparent from the following description wherein reference is made to the drawing, in which:

FIG. 1 is a complete wiring diagram illustrating a preferred embodiment of the invention; and FIGS. 2 and 3 are fragmentary wiring diagrams showing modified embodiments of the invention.

Referring to FIG. 1, conductors L1, L2, and L3 of an electrical distribution system extend from a source of power, illustrated as a secondary winding 9 of a polyphase transformer, through fuses 10, contacts 11A of a disconnect switch 11, and a ground sensor such as a differential current transformer 12 to a load 14. A grounded neutral conductor L4 is also shown as part of the distribution system and extends from a grounded neutral terminal of the transformer winding 9 through the current transformer 12 to the load 14. The conductors L1, L2, L3, and L4, for at least part of their length, may be enclosed within a metal housing 15 of a busway. Although the system has been shown as a three-phase, four-wire system, it may be a single-phase or any polyphase system with or without a grounded or neutral conductor.

The fuses 10, which may be on the load side of the contacts 11A instead of the source or line side as shown, are illustrative of a current-responsive circuit-interrupting means which has a current-interrupting ability equal to or greater than the maximum fault current available from the source but which is so insensitive to relatively small fault currents that it fails to respond to such currents or does so only after the fault currents have done considerable damage.

The disconnect switch 11, which may be of the bolted pressure contact type, includes an electroresponsive operating or trip means such as a coil 11B and associated magnetic plunger which, when the coil 11B is energized, moves to affect opening of the switch 11. A lever-type manual operator 11C may also be provided for operating the switch 11. The switch 11 has a current-interrupting ability which is far less than the maximum available fault current, for example, only four to six times the normal load current of the circuit.

The transformer 12 comprises a core 12A of a suitable flux-conducting material defining a window through which the conductors L1, L2, L3, and L4 pass. The currents flowing in the conductors induce a flux within the core 12A. This flux has a vector sum of zero when the currents in the conductors L1, L2, and L3 are balanced, i.e., are equal and separated by an equal number of electrical degrees, but has a finite value when the currents are unbalanced. The transformer 12 has a secondary winding 12B. When the currents in the conductors L1, L2, and L3 are balanced, or when they are unbalanced with a return flow in the conductor L4, no voltage appears at the terminals of the winding 12B. However, a ground fault anywhere along the system on the load side of the differential transformer 12 causes such an unbalance of these currents that their vector sum is not zero, and the resultant flux in the core 12A causes a signal voltage to appear at the secondary winding 12B directly related in magnitude of the ground fault current.

The terminals of the winding 12B are interconnected through a loop circuit including series-connected adjustable resistors 15 and 16 shunted respectively by relay coils 18A and 19A. The coil 18A is the operating winding of a normally open electromagnetic relay 18 having a normally open contact 18B and a time delay means, such as a dash pot 18C, for delaying the closure of the contact 18B. The coil 19A is the operating winding of a normally-closed electromagnetic relay 19 having a normally closed contact 19B. The contacts 18B and 19B are connected in series with each other and with a normally open contact 11D of the disconnect switch 11 and the winding 11B across a source of voltage indicated by a battery 20 to form an energizing circuit for the operating means of the switch 11. Instead of being supplied from the battery 20, the energizing circuit including the contacts 18B, 19B, and 11D and the coil 11B could be supplied from any two of the conductors L1, L2, and L3 on the source side of the contacts 11A through a stepdown transformer. The contacts 18B may be bypassed by the contact of a normally open, momentary-contact pushbutton 21. The switch 11 is shown in its closed position, and the relays 18 and 19 are shown in their respective deenergized positions.

In operation of the circuit of FIG. 1, upon the occurrence of a fault, such as a ground fault, in the system including the conductors L1, L2, L3, and L4, the voltage appearing at the secondary winding 12B tends to cause pickup of the relays 18 and 19. The relay 18, either by its selection or by adjustment of the resistors 15 and 16, or both, picks up at a relatively low-voltage value, and the relay 19, either by its selection or by adjustment of the resistors 15 and 16, or both, picks up at a relatively high-voltage value.

If the fault current is relatively large, the voltage at the winding 12B is high enough to cause pickup of both of the relays 18 and 19. The consequent closing of the contact 18B is delayed momentarily by the dash por pot 18C and consequent opening of the contact 19B prevents energization of the coil 11B and consequent opening of the disconnect switch 11. Such a fault must be cleared by the fuses 10.

If, however, the fault current is relatively small so as to be below the interrupting ability of the switch 11, the voltage at the winding 12B is too low to pick up the relay 19 but is sufficient to pick up the relay 18. Consequent closure of the contact 18B with the contact 19B closed causes energization of the coil 11B and consequent opening of the contacts 11A of the disconnect switch 11. This interrupts the circuit through the conductors L1, L2, and L3, and the relay 18 thereupon returns to its normal position. However, the switch 11 remains open with the circuit to the winding 11B interrupted at the contacts 18B and 11D.

Manual opening of the switch 11 may be effected at any time by closure of the pushbutton 21 or by means of the manual operator 11C.

Referring now to the modification of FIG. 2, the relays 18 and 19 are connected in parallel with each other across the secondary winding 12B in series with respective adjustable resistors 24 and 25. The relays 18 and 19 in FIG. 2 are thus responsive to the voltage across the winding 12B as in FIG. 1.

In FIG. 3, current relays 28 and 29 are substituted respectively for the voltage relays 18 and 19 of FIGS. 1 and 2. Operating windings 28A and 29A of the relays 28 and 29 are connected in series with each other and with a resistor 30 in a loop circuit including the secondary winding 12B.

Operation of the embodiments of FIGS. 2 and 3 is the same as the operation of the embodiment of FIG. 1.

Although, in the preferred embodiments disclosed herein, only electromagnetic relays have been illustrated and described, it is apparent that other types of relays may be used if desired.

We claim:

1. Ground fault protective circuitry and apparatus for an electrical distribution system supplied from a source of alternating current having a grounded neutral terminal, said circuitry and apparatus comprising circuit-interrupting means interposed in the system and capable of interrupting the system when relatively large fault currents are flowing, said circuit-interrupting means being responsive to relatively large fault currents for interrupting the system, disconnect switch means interposed in the system and capable, upon opening thereof, of interrupting the system when normal load or relatively small fault currents are flowing but incapable, upon opening thereof, of interrupting the system when relatively large fault currents are flowing, means providing a signal voltage directly related in magnitude to the magnitude of a fault current in the system, a first relay having a normally open conductive path, a second relay having a normally closed conductive path, means for impressing the signal voltage on the relays for causing operation of the respective relays in response to the signal voltage, the first relay being operative to close its conductive path at a relatively low value of the signal voltage indicative of a fault current within the interrupting ability of the disconnect switch means and the second relay being operative to open its conductive path at a relatively large value of the signal voltage indicative of a fault current greater than the interrupting capability of the disconnect switch means, electroresponsive means operative when energized to open the disconnect switch means, and an energizing circuit for the electroresponsive means including the electroresponsive means and the conductive paths of the relays connected in series.

2. Ground fault protective circuitry and apparatus as described in claim 1 wherein the means providing the signal voltage is a ground sensor differential transformer having a secondary winding and responsive to unbalanced currents in the system caused by a fault current in the system to provide the signal voltage at the secondary winding.

3. Ground fault protective circuitry and apparatus as described in claim 1 wherein means are provided for delaying closure of the conductive path of the first relay.

4. Ground fault protective circuitry and apparatus as described in claim 1 wherein the first relay is an electromagnetic relay having a normally open contact defining the normally open conductive path and an operating winding, the second relay is an electromagnetic relay having a normally closed contact defining the normally closed conductive path and an operating winding, and the means for impressing the signal voltage on the relays impresses it on the operating windings thereof.

5. Ground fault protective circuitry and apparatus as described in claim 4 wherein a pair of adjustable resistors are connected in series with each other, and the operating windings of the relays are connected in parallel with the respective resistors of the pair.

6. Ground fault protective circuitry and apparatus as described in claim 4 wherein the operating windings of the relays are connected in parallel with each other.

7. Ground fault protective circuitry and apparatus as described in claim 4 wherein the relays are series relays and the operating windings are connected in series with each other so that all of the current produced by the signal voltage flows in the operating windings.

PO-1050
(5/69)

UNITED STATES PATENT OFFICE
CERTIFICATE OF CORRECTION

Patent No. 3,579,038        Dated May 18, 1971

Inventor(s) Robert P. Backderf and Douglas R. Kanitz

It is certified that error appears in the above-identified patent and that said Letters Patent are hereby corrected as shown below:

Column 2, line 32, after "magnitude" insert -- to the magnitude --; line 69, delete "por".

Signed and sealed this 7th day of September 1971.

(SEAL)
Attest:

EDWARD M. FLETCHER, JR.
Attesting Officer

ROBERT GOTTSCHLAK
Acting Commissioner of Patents